US010450403B2

(12) United States Patent
Wang et al.

(10) Patent No.: US 10,450,403 B2
(45) Date of Patent: Oct. 22, 2019

(54) COMPOSITION FOR POLYURETHANE FOAMING, POLYURETHANE FOAM AND USE THEREOF

(71) Applicant: Wanhua Chemical (Ningbo) Rongwei Polyurethane Co., Ltd., Zhejiang (CN)

(72) Inventors: Junfeng Wang, Zhejiang (CN); Xialin Zhu, Zhejiang (CN); Jing Chen, Zhejiang (CN)

(73) Assignee: Wanhua Chemical (Ningbo) Rongwei Polyurethane Co., Ltd., Zhejiang (CN)

( * ) Notice: Subject to any disclaimer, the term of this patent is extended or adjusted under 35 U.S.C. 154(b) by 109 days.

(21) Appl. No.: 15/540,763

(22) PCT Filed: Jan. 29, 2015

(86) PCT No.: PCT/CN2015/071824
§ 371 (c)(1),
(2) Date: Jun. 29, 2017

(87) PCT Pub. No.: WO2016/115751
PCT Pub. Date: Jul. 28, 2016

(65) Prior Publication Data
US 2018/0022856 A1 Jan. 25, 2018

(30) Foreign Application Priority Data
Jan. 22, 2015 (CN) .......................... 2015 1 0031736

(51) Int. Cl.
C08G 18/18 (2006.01)
C08G 18/48 (2006.01)
C08G 18/50 (2006.01)
C08G 18/75 (2006.01)
C08J 9/08 (2006.01)
C08K 5/521 (2006.01)
C08L 75/08 (2006.01)
C08G 18/76 (2006.01)
C08G 101/00 (2006.01)

(52) U.S. Cl.
CPC ..... C08G 18/1825 (2013.01); C08G 18/1833 (2013.01); C08G 18/482 (2013.01); C08G 18/4816 (2013.01); C08G 18/4829 (2013.01); C08G 18/4837 (2013.01); C08G 18/4841 (2013.01); C08G 18/5021 (2013.01); C08G 18/5033 (2013.01); C08G 18/7657 (2013.01); C08G 18/7664 (2013.01); C08J 9/08 (2013.01); C08K 5/521 (2013.01); C08G 2101/005 (2013.01); C08G 2101/0025 (2013.01); C08G 2101/0083 (2013.01)

(58) Field of Classification Search
CPC ........... C08G 18/4804; C08G 18/4812; C08G 18/4837; C08G 18/4841; C08G 18/1825; C08G 18/1833; C08G 18/4816; C08G 18/482; C08G 18/4829; C08G 18/4827; C08G 18/5021; C08G 18/5033; C08G 18/7657; C08G 18/7664; C08G 2012/0025; C08G 2012/005; C08G 2012/0083; C08J 9/08; C08K 5/521; C08L 75/08
See application file for complete search history.

(56) References Cited

U.S. PATENT DOCUMENTS

| 5,470,890 | A | * | 11/1995 | House | .................... | C08G 18/10 |
| | | | | | | 521/128 |
| 2005/0043423 | A1 | * | 2/2005 | Schmidt | ............... | C08G 18/482 |
| | | | | | | 521/155 |
| 2012/0264842 | A1 | * | 10/2012 | Tomovic | .................. | C08J 9/141 |
| | | | | | | 521/129 |

(Continued)

FOREIGN PATENT DOCUMENTS

| CN | 101497740 A | 8/2009 |
| CN | 102504175 A | 6/2012 |
| CN | 102585138 A | 7/2012 |

(Continued)

OTHER PUBLICATIONS

Machine translation of CN-102942676-A obtained from the European Patent Ofifice in Jan. 2019.*

(Continued)

Primary Examiner — Melissa A Rioja
(74) Attorney, Agent, or Firm — Stinson LLP

(57) ABSTRACT

A composition for polyurethane foaming, a polyurethane foam and a use thereof. The composition contains two different polyols with a polyethylene oxide ether structure and a polypropylene oxide ether structure, and a specific type of catalyst, flame retardant and water are added thereto; at the same time, the composition contains a small amount of a surfactant and other small molecular alcohols. The traits of the product are that it is pale yellow and transparent, and the product is not layered during long-term storage. The above-mentioned composition and polyphenylpolymethylene polyisocyanate (PAPI) produce a low-density polyurethane foam by means of a foaming machine. The foam has a good thermal insulation effect and a high rate of yield, and the foam has a flame retardant property, that is to say, same can be used for construction insulation, and can also be used for packaging a buffer material, has a good thermal insulation, adhesion and dimensional stability, and has a low odor during the process of construction, the foaming agents all use water, and do not contain chlorofluorocarbon substances that destroy the ozone layer and climate.

15 Claims, No Drawings

(56) References Cited

U.S. PATENT DOCUMENTS

2015/0017856 A1* 1/2015 Davis .................. C09D 105/00
   442/138
2017/0247591 A1* 8/2017 Crain ....................... B05D 1/02

FOREIGN PATENT DOCUMENTS

| CN | 102942676 A | * | 2/2013 |
| CN | 103073986 A | | 5/2013 |
| CN | 103819644 A | | 5/2014 |
| CN | 104169318 A | | 11/2014 |
| JP | 5787414 | | 5/1982 |
| JP | 2004269666 A | | 9/2004 |
| JP | 2009138134 A | | 6/2009 |
| JP | 201127893 A | | 3/2011 |
| WO | 2013178657 A1 | | 5/2013 |
| WO | 2013182527 A | | 12/2013 |

OTHER PUBLICATIONS

Poly-Q® 40-800 Product Description from Monumental Chemical obtained from the Monumental Chemical website in Jan. 2019.*

* cited by examiner

COMPOSITION FOR POLYURETHANE FOAMING, POLYURETHANE FOAM AND USE THEREOF

This application claims priority to International Application Number PCT/CN2015/071824, filed on 29 Jan. 2015, which claims priority from CN Patent Application No. 201510031736.X, filed on 22 Jan. 2015, both of which are hereby incorporated by reference in their entireties.

TECHNICAL FIELD

The present invention relates to a composition for polyurethane foaming, a polyurethane foam and a use thereof, especially to a composition for low density, all-water-blown polyurethane foaming, a low density, all-water-blown polyurethane foam and a use thereof. The foam produced by the reaction between the composition of the present invention and polyphenylpolymethylene polyisocyanate (PAPI) can be used in the thermal insulation filling materials, thermal insulation, sound insulation, damp proof of buildings, and it can also be used for the packaging industry of precise instrument.

TECHNICAL BACKGROUND

Polyurethane foam plastic is a kind of foam material with high performance, the insulation property thereof is the best among other foam materials, at the same time, polyurethane foam plastic has good material strength. It is the best choice in the field of insulation such as refrigerator, solar energy, heat distribution pipeline, construction, automobiles and cold chains. As a high value has been put on energy efficiency of the construction in our country, the amount of polyurethane foam insulation material used in the construction industry in our country is expanded year by year. In our country, recently, the foaming agent used to produce the polyurethane foam used in construction is mainly HCFC-141B, which is a substance that destroys the ozone layer, and it is inhibited now. The foaming agents that can replace HCFC-141B are HFC-245fa, 365mfc, cyclopentane, all water foaming. The cost of HFC-245fa is too high, 365mfc and cyclopentane are flammable, thus they cannot be used for in situ spraying, and the flame retardance of the foam is poor. Foaming agents that are made with only water is a technical route that is low cost, environmental friendly and easy to achieve flame retardance, which can replace HCFC-141B. It is specially suitable for buildings with thick interlayers, for example: inside the roof of a single-family house, in the buildings with curtain wall structure, in ceilings with cavities, in internal walls of the wood houses, in brick wall structures with cavities. The polyurethane foam can be filled with on-site construction method, plays the role of insulation, sound insulation, damp proof, and the space can be fully utilized, thus additional insulation layer that takes extra area of the building is avoided.

All-water-blown polyurethane foaming compositions were already on the market, but they have many problems: the flame retardant in the formulae is not miscible with water, the product is not clear and transparent; the compositions are easy to be layered, and have short-term storage life; in the prior art, a large amount of solubilizers need to be added, so that components are miscible with each other and the storage life can be increased, however the cost is too high and the cells are rough. At present, the catalysts of foaming reaction of polyurethane generally have the structure of organic tertiary amine, for example: catalyst A1 that is usually used in the all water spraying foam industry, i.e. bis(diaminoethyl)ether, which has a strong catalytic effect for the reaction of polyurethane, but it is very volatile, and smells bad, initiates eye and skin. Thus it causes damage to the bodies of the workers during construction. A few types of polyurethane are used in the existing technology, causing the cells to be rough, the adhesion to be poor, the products are crisp and easy to shrink, and it is impossible to give consideration to the intermiscibility, workability and foam property of polyol products.

Therefore, a new formula of all-water-blown polyurethane foaming composition is needed, components in the formula should be well miscible with each other, there's no large amount of volatile substance generated during construction and the property of the foam prepared is good.

SUMMARY OF THE INVENTION

One of the objects of the present invention is to provide a composition for polyurethane foaming, especially a composition for low density, all-water-blown polyurethane foaming, said composition is transparent liquid, and is not easy to be layered; it is almost scent-free during construction.

Another object of the present invention is to provide a polyurethane foam, which has a very low foam density (for example 6-15 kg/m$^3$), and its expansion ratio can be as high as 100 times. For the same volume of foam, the amount used for insulation construction of the present invention is only ¼-⅕ of that of the ordinary foam, thus it can largely save the cost, and the foam has good dimensional stability, longer life and a stronger adhesion with the substrate.

Still another object of the present invention is to provide a use of the polyurethane foam, which can be used in the thermal insulation filling materials, thermal insulation, sound insulation, damp proof of buildings, and it can also be used for the packaging of precise instrument.

The present invention provides a composition for polyurethane foaming (which can also be called a combination of polyols), based on 100 parts by weight of the composition, it comprises the following materials in parts by weight:
  10-30 parts, preferably 15-25 parts of polyether polyol A;
  20-40 parts, preferably 25-35 parts of polyether polyol B;
  10-40 parts, preferably 20-30 parts of flame retardant;
  10-30 parts, preferably 13-18 parts of water;
  1-4 parts, preferably 2-3 parts of surfactant;
  1-8 parts, preferably 3-6 parts of catalyst;
  wherein, the average functionality of polyether polyol A is 4-8, the hydroxyl value is 300-700 mgKOH/g;
  wherein, the average functionality of polyether polyol B is 2-4, the hydroxyl value is 20-200 mgKOH/g;
  wherein, the flame retardant is one kind of phosphate or a mixture of several kinds of phosphates, the phosphorus content of the flame retardant is 8-40 wt %;
  wherein, the catalyst is a mixture of organic tertiary amines that contain hydroxyl group.

The composition of the present invention is colorless or pale yellow transparent liquid at room temperature, the storage life thereof can be as long as 5 months without layering or degeneration. When using the composition of the present invention, the above composition is mixed under room temperature, then it is foamed by high pressure foaming process with polyphenylpolymethylene polyisocyanate under the weight ratio of 100:100-150.

The differences between the foam prepared using the composition of the present invention and the common polyurethane stiff foam that can be used for insulation lie in, the foams prepared by the present invention are mostly open pores, thus they can keep good dimensional stability under very low density without shrinking or expanding.

In the composition of the present invention, preferably, the polyether polyol A is produced by the polymerization of propylene oxide, ethylene oxide and the mixture of one or more of sorbitol, sucrose, pentaerythritol, 2,4-diamino-phenol, ethylenediamine and tris(hydroxymethyl)propane in any mixing ratio as an initiator; wherein the molar ratio between the propylene oxide and the ethylene oxide is 7:3-9:1, preferably 7:3-8:2.

In the composition of the present invention, preferably, the polyether polyol A is produced by the polymerization of propylene oxide, ethylene oxide and the mixture of sucrose, tris(hydroxymethyl)propane, sorbitol in any mixing ratio as an initiator; the average functionality is 4-5, preferably 4.5-4.8; the hydroxyl value is 400-500 mgKOH/g, preferably 450-480 mgKOH/g; the molar ratio between the propylene oxide and the ethylene oxide is 7:3-8:2. In the present invention, the weight ratio of sorbitol, sucrose and tris (hydroxymethyl)propane can be 100-150:180-230:260-300, preferably 109-120:200-205:268-280.

In the composition of the present invention, preferably the polyether polyol A is produced by the polymerization of propylene oxide, ethylene oxide and 2,4-diamino-phenol or/and ethylenediamine as an initiator, preferably it is produced by the polymerization of propylene oxide, ethylene oxide with 2,4-diamino-phenol and ethylenediamine as initiators; the average functionality is 4-5, preferably 4-4.5; the hydroxyl value is 500-700 mgKOH/g, preferably 600-680 mgKOH/g, the molar ratio between the propylene oxide and the ethylene oxide is 7:3-9:1, preferably 8:2-9:1.

In the composition of the present invention, preferably, the polyether polyol B is produced by the polymerization of propylene oxide, ethylene oxide and the mixture of one or more of dipropylene glycol, diethylene glycol or triethanolamine and glycerol in any mixing ratio as an initiator, and at the end of the reaction, it is blocked by ethylene oxide so that the terminal group of the polyether polyol B is a primary hydroxyl. More preferably, the polyether polyol B is produced by the polymerization of propylene oxide, ethylene oxide and the mixture of glycerol and triethanolamine in any mixing ratio as an initiator, and at the end of the reaction, it is blocked by ethylene oxide so that the terminal group of the polyether polyol B is a primary hydroxyl. The hydroxyl value of the polyether polyol B can be 20-90 mgKOH/g, preferably 25-80 mgKOH/g, the average functionality is 2-3, preferably 2.5-3; the molar ratio between the propylene oxide and the ethylene oxide is 7:3-9:1, preferably 7:3-8:2. More preferably, the polyether polyol B is selected from one or more of Wanol RF3135, Wanol RF3160 produced by WANHUA CHEMICAL (Ningbo) RONGWEI POLYURETHANE CO., LTD.

The advantages of the polyether polyols used in the present invention lie in that the polyols using mixed initiator have better integrated performance compared with the same kind of product in the market that is used for buildings and that uses single component polyether. Polyol A and polyol B must be used at the same time, with suitable ratio to achieve the best effect.

In the present invention, the initiator with high functionality of the polyether polyol A component allows the foams to have small cells, thus they can maintain good insulation effects. The structure of the polyether polyol B with a primary hydroxyl terminal group is characterized in high activity, fast reaction, so that the foams won't shrink or collapse during the foaming process; the relative low functionality would open the cells by the end of the foaming reaction, thus avoiding the foams to shrink after they are formed.

The mixed polyether polyol A and polyether polyol B used in the present invention are miscible with water, flame retardant and additives, so that when the additives are mixed together, the mixture is homogeneous and transparent, and not easy to be layered at room temperature for long term storage. A transparent and stable system can be obtained without or with very small amount of solubilizer. Aliphatic chain initiators such as glycerol, sorbitol, triethanolamine, trimethylolpropane are used, which makes the polyurethane foam have good flexibility, decreased brittleness and increased adhesion.

In the composition of the present invention, preferably, the catalyst comprises the mixture of dimethylamino ethoxyethanol and trimethylethoxyethylenediamine in any proportion, and further comprises one or more of N, N, N'-trimethyl-N'-hydroxyethyl diamino ethyl ether, trimethyl hydroxyethyl propanediamine, dimethylethanolamine. Preferably, said catalyst is the composition of dimethylamino ethoxyethanol, trimethylethoxyethylenediamine and N, N, N'-trimethyl-N'-hydroxyethyl diamino ethyl ether. More preferably, the catalyst is the composition of dimethylamino ethoxyethanol, trimethylethoxyethylenediamine and N, N, N'-trimethyl-N'-hydroxyethyl diamino ethyl ether in a mass ratio of 1-3:1-3:0-3. More preferably, the catalyst is the composition of dimethylamino ethoxyethanol, trimethylethoxyethylenediamine and N, N, N'-trimethyl-N'-hydroxyethyl diamino ethyl ether in a mass ratio of 3:1:1.

Compared with the existing technology on the market, which uses large amount of bis(dimethylaminoethyl) ether and dimethyl cyclohexylamine as the catalyst, the total amount of the catalyst reaches to more than 4%, and the smell during construction is extremely malodorous. In the component of the catalysts used in the present invention, the amount of bis(dimethylaminoethyl) ether or dimethyl cyclohexylamine can be completely zero, thus it won't cause any discomfort for the people during construction.

Compared with the existing technology, most of the catalysts used in the present invention comprise hydroxyl, and can be reacted with isocyanate to be embedded into the macromolecule chain, thus the composition for polyurethane foaming of the present invention are characterized in low volatility, low odor and barely generates the smell of amine during construction.

In the composition of the present invention, preferably, the flame retardant is the mixture of one or two of tris(2-chloropropyl) phosphate, tris(2-chloroethyl) phosphate and triethyl phosphate, wherein triethyl phosphate represents at least 40% of the total parts by weight of the flame retardant; preferably, the flame retardant is the mixture of triethyl phosphate and tris(2-chloropropyl) phosphate in a mass ratio of 1-3:1-3. More preferably, the flame retardant is the mixture of triethyl phosphate and tris(2-chloropropyl) phosphate in a mass ratio of 1:1.

The flame retardant used in the present invention are chemically stable and contains less amount of volatile impurities, which is advantageous in extending storage life and reducing odor. The mixture of different kinds of flame retardants are used to improve the miscibility with water so that no or very small amount of solubilizer or emulsifier/disperser are used to achieve clear and transparent product that are stable and won't layer at room temperature. The phosphorus-halogen synergistic flame-retarded effect is used by a rational content ratio of phosphor and halogen in the flame retardant to achieve the best flame retardant effect with the least amount of flame retardant.

In the composition of the present invention, preferably, the parts by weight of water are 10-30 parts, preferably 13-18 parts. The role of water is to react with isocyanate during foaming to generate carbon dioxide gas to thereby promote foaming, meanwhile, the excess amount of water volatilizes to form gas itself, thus water plays the role of both chemical foaming agent and physical foaming agent.

In the composition of the present invention, preferably, the surfactant is formed by the block copolymerization of polymethyl siloxane, propylene oxide and ethylene oxide. Preferably, the surfactant of the present invention is L-6186, L-5345 of Momentive high-tech materials company, Ltd, USA or DS-5950 of Air Chemicals. The surfactant can keep the foams fine, smooth and open during the foaming process.

In the composition of the present invention, preferably, the composition comprises 0-3 parts by weight, preferably 1-2 parts by weight of other additives, and the other additives are selected from one or two of triethanolamine, glycerol so as to make the foams finer and smoother.

The present invention also provides a polyurethane foam, which is obtained from the above composition. Preferably, it is obtained by the reaction of the above composition with polymethylene polyphenyl polyisocyanate PAPI. The polyurethane foam of the present invention is preferably low density all-water-blown polyurethane foam, and the foaming process thereof comprises three stages of reaction.

In the first stage, water and PAPI began to react and release heat, a small amount of carbon dioxide gas, and the foam started to be formed. At this time, the system is still at liquid state. Under the action of the surfactant, PAPI and all the components of the composition maintain a uniform, stable liquid foam, the total volume increases to 5% of the final foam, and most of the components in the system are still in the state of small molecules. This stage is similar to the first stage of foaming of ordinary rigid foam. If spray construction is used, the reaction time of this stage is about 1.5 seconds; if pouring construction is used, the reaction time of this stage is about 5-10 seconds.

In the second stage, water and PAPI continue to react and release a large amount of carbon oxide gas, and the foam expands rapidly. At the same time, polyether polyol B, polyether polyol A react with PAPI successively. The molecular weight increases exponentially, the viscosity increases rapidly, and the foam quickly grows into gel state so that during the process of the rapid expand of the foam, the foam would still be stable and won't collapse. Under the action of the surfactant, the foam would still be fine and smooth, which are not rough and do not combine together. Under the condition of typical spray construction, the reaction time of this stage is about 5 seconds, and the overall chemical reaction completed 90%. Under the condition of pouring construction, the reaction time of this stage is about 20-40 seconds.

In the third stage, the reaction continues to carry out, to form solid high polymer foamed plastics. Polyether polyol, PAPI are all multifunctional, therefore, high molecular foam material with a certain degree of crosslinking is formed. Under the action of the surfactant, the foam are with the shape of polygon and are dispersed homogeneously, and they have special structures with thicker skeleton and thinner foam wall. The temperature of the system and the release of the heat reach the maximum level, excess amount of water vaporizes under high temperature and breaks through most of the foam wall to enter into the air outside, and finally polyurethane foam plastics with open cells are formed. Under the condition of typical spray construction, the reaction time of this stage is about 2-3 seconds. Under the condition of pouring construction, the reaction time of this stage is about 10-20 seconds.

The advantages of the composition of the present invention lie in that the foaming sprayer and the pouring machine used can be almost all types of machines that are on the market, the composition can react with PAPI with the mass ratio of 100:100-150, preferably 100:100-120, and construction can be carried out under any weather condition above 15° C. The composition has good tolerance to the construction conditions.

The foam prepared by the composition of present invention and PAPI is open cell type, and has a high aperture ratio of above 80%. Under most of the construction conditions, the foam has a aperture ratio of above 90%, and the foam does not shrink or deform under natural temperature conditions.

In the present invention, the high pressure foaming process normally refers to spraying. High pressure sprayer is used to mix the composition of the present invention and PAPI and spray them onto walls including the internal surface of roofs. The foams are formed immediately, within 5 seconds, they become solid; within 10 seconds, the solidification is completed; within half an hour, the degree of aging reaches above 95%.

The high pressure foaming process of the present invention can also be a perfusion process, foam pouring machine is used to mix the composition of present invention and PAPI and the mixture is injected into the insulation layer of the buildings. The foams are formed within 5 seconds, and are solidified within 30 seconds; within 1 hour, the degree of aging reaches above 95%. There's no limitation to the shape of the insulation layer which can be square, spherical, or special shapes.

In addition, the present invention also provides use of the above polyurethane foam, which is used in thermal insulation filling materials, thermal insulation, sound insulation, damp proof of buildings, as well as the packaging of precise instrument.

EMBODIMENTS

The present invention is further illustrated by the following embodiments, however, the embodiments are provided for a better understanding of the content of the present invention, and do not limit the extent of protection of the present invention.

In the present invention, unless otherwise stated, "parts" represent "parts by weight"; "%" represents "wt %", i.e. weight percentage.

Preparation Examples 1-5

Polyether polyol 1 was a polyether polyol that was prepared by the polymerization of ethylene oxide, propylene oxide and sorbitol, sucrose, trimethylolpropane, wherein the sorbitol, sucrose, trimethylolpropane were used as initiators. The hydroxyl value was 450 mgKOH/g, and the average functionality was 4.5. The specific preparation method was as follows: 109 g sorbitol, 205 g sucrose, 268 g trimethylolpropane and 35 g catalyst were fed into a 2.5 L jacketed reaction vessel, and the temperature was increased gradually to 70° C. Stirring was started, the reaction vessel was evacuated, and excess amount of water of the raw material was removed, then the content inside the reaction vessel was replaced by nitrogen. 1000 g propylene oxide and 200 g ethylene oxide (the molar ratio between them is about 8:2) were slowly fed into the reaction vessel within 2 hours, the pressure was kept below 0.25 MPa, and the temperature was slowly increased to 100° C. until the completion of feeding. Then the temperature was increased to about 120° C. and was kept for 3 hours. After the reaction was completed, the temperature was decreased to below 90° C., the pH was adjusted, then the resulting polyether polyol was refined and filtered.

Polyether polyol 2 was a polyether polyol that was prepared by the polymerization of ethylene oxide, propylene oxide, sorbitol and trimethylolpropane, wherein the sorbitol and trimethylolpropane were used as mixed initiators. The hydroxyl value was 350 mgKOH/g, and the average functionality was 5. The specific preparation method was as follows: 364 g sorbitol, 134 g trimethylolpropane and 32 g catalyst were fed into a 2.5 L jacketed reaction vessel, and the temperature was increased gradually to 70° C. Stirring was started, the reaction vessel was evacuated, and excess amount of water of the raw material was removed. The content inside the reaction vessel was replaced by nitrogen, 1500 g propylene oxide and 300 g ethylene oxide (the molar ratio between them is about 8:2) were slowly fed into the reaction vessel within 2 hours, the pressure was kept below 0.25 MPa, and the temperature was slowly increased to 100° C. After the completion of feeding, the temperature was increased to about 110° C. and was kept for 3 hours. The temperature was decreased to below 90° C. after the reaction was completed, then the pH was adjusted, the resulting polyether polyol was refined and filtered.

Polyether polyol 3 was a polyether polyol that was prepared by the polymerization of ethylene oxide, propylene oxide, 2,4-diaminophenol and ethanediamine, wherein the 2,4-diaminophenol and ethanediamine were used as mixed initiators. The hydroxyl value was 680 mgKOH/g, and the average functionality was 4. The specific preparation method was as follows: 366 g 2,4-diaminophenol, 180 g ethanediamine were fed into a 2.5 L jacketed reaction vessel, and the temperature was increased gradually to 70° C. Stirring was started, then the content inside the reaction vessel was replaced by nitrogen. 1561 g propylene oxide and 132 g ethylene oxide (the molar ratio between them is about 9:1) were slowly fed into the reaction vessel within 2 hours, the pressure was kept below 0.25 MPa, and the temperature was slowly increased to 100° C. After the completion of feeding, the temperature was increased to about 110° C. and was kept for 2 hours. The temperature was decreased to below 90° C. after the reaction was completed, then the resulting polyether polyol was refined and filtered.

Polyether polyol 4 was a polyether polyol that was prepared by the polymerization of ethylene oxide, propylene oxide, glycerol and dipropylene glycol, wherein the glycerol and dipropylene glycol were used as mixed initiators. The hydroxyl value was 25 mgKOH/g, and the average functionality was 2.5. The specific preparation method was as follows: 645 g glycerol, 940 g dipropylene glycol and 40 g catalysts were fed into a 2.5 L jacketed reaction vessel, and the temperature was increased gradually to 70° C. Stirring was started, the reaction vessel was evacuated, excess amount of water of the raw material was removed. The content inside the reaction vessel was replaced by nitrogen, 410 g propylene oxide was slowly fed into the reaction vessel within 2 hours for a reaction, the pressure was kept below 0.25 MPa, and the temperature was kept at 90-100° C., until the completion of feeding. Then 133 g ethylene oxide (the molar ratio between propylene oxide and ethylene oxide was about 7:3) was slowly fed into the reaction vessel within 2 hours for a reaction, the pressure was kept below 0.25 MPa until the completion of feeding. Lastly, the temperature was increased to about 120° C. and was kept for 3 hours. The temperature was decreased to below 90° C. after the reaction was completed, then the resulting polyether polyol was refined and filtered.

Polyether polyol 5 was a polyether polyol that was prepared by the polymerization of ethylene oxide, propylene oxide, glycerol and triethanolamine, wherein the glycerol and triethanolamine were used as mixed initiators. The hydroxyl value was 80 mgKOH/g, and the functionality was 3. The specific preparation method was as follows: 644 g glycerol, 1044 g triethanolamine and 30 g catalyst were fed into a 2.5 L jacketed reaction vessel, and the temperature was increased gradually to 70° C. Stirring was started, the reaction vessel was evacuated, and excess amount of water of the raw material was removed. The content inside the reaction vessel was replaced by nitrogen, 438 g propylene oxide was slowly fed into the reaction vessel within 2 hours for a reaction, the pressure was kept below 0.25 MPa, the temperature was kept at 90-100° C., until the completion of feeding. Then 142 g ethylene oxide (the molar ratio between propylene oxide and ethylene oxide was about 7:3) was slowly fed into the reaction vessel within 2 hours for a reaction, the pressure was kept below 0.25 MPa until the completion of feeding. Then the temperature was increased to about 120° C. and was kept for 3 hours. The temperature was decreased to below 90° C. after the reaction was completed, then the pH was adjusted, the resulting polyether polyol was refined and filtered.

The catalyst used in the above preparation examples was potassium hydroxide.

The polyphenylpolymethylene polyisocyanate used in the following examples was PM-200 from Wanhua, Yantai, the detailed parameters were shown in the following table:

| Product brand | Appearance | Viscousity (25° C.) mPa·s | -NCO (% Wt) | Density (25° C.) g/cm$^3$ | Acid component (%, calculated based on HCL) | Chlorine from hydrolysis (%) |
|---|---|---|---|---|---|---|
| WANNATE PM-200 | Brown liquid | 150-250 | 30.2-32.0 | 1.220-1.250 | ≤0.05 | ≤0.2 |

Surfactant L-5345: Momentive high-tech materials company, Ltd., USA.

Examples 1-5

The composition of the formula shown in table 1 and PM200 of Wanhua Chemical Company were foamed using a high pressure sprayer Graco A20, the volume ratio of the two components was 1:1 (the weight ratio was 1:1.1). The polyurethane foam prepared was measured in accordance with common industry standard, and its performance is shown in table 2.

In the following table, the amounts of components are parts by weight, EO is ethylene oxide, PO is propylene oxide.

TABLE 1

| Component | Example 1 | Example 2 | Example 3 | Example 4 | Example 5 |
|---|---|---|---|---|---|
| Polyether polyol 1: the polyether polyol prepared by the polymerization of EO, PO, sorbitol, sucrose and trimethylolpropane, wherein the sorbitol, sucrose and trimethylolpropane were used as initiators, hydroxyl value 450 mgKOH/g, average functionality 4.5, the ratio between ethylene oxide and propylene oxide was about 8:2 (molar ratio, the same as below) | 12.0 | | 22 | 17.5 | 22 |
| Polyether polyol 2: the polyether polyol prepared by the polymerization of EO, PO, sorbitol and trimethylolpropane, wherein the sorbitol and trimethylolpropane were used as mixed initiators, functionality 5, hydroxyl value 350 mgKOH/g, the ratio between ethylene oxide and propylene oxide was about 8:2 | | 15.0 | | | |
| Polyether polyol 3: the polyether polyol prepared by the polymerization of EO, PO, 2,4-diaminophenol and ethanediamine, and the 2,4-diaminophenol and ethanediamine were used as initiators, hydroxyl value 680 mgKOH/g, average functionality 4, the ratio between ethylene oxide and propylene oxide was about 9:1 | | 7.0 | | | |
| Polyether polyol 4: the polyether polyol prepared by the polymerization of EO, PO, glycerol and dipropylene glycol, wherein the glycerol and dipropylene glycol were used as initiators, average functionality 2.5, hydroxyl value 25 mgKOH/g, | 10.0 | 25.0 | 16.0 | 13.0 | 17.0 |
| Polyether polyol 5: the polyether polyol prepared by the polymerization of EO, PO, triethanolamine and glycerol, wherein the triethanolamine and glycerol were used as initiators, average functionality 3, hydroxyl value 80 mgKOH/g, | 10.0 | 15.0 | 15.0 | 13.0 | 15.0 |
| Tris(2-chloropropyl)phosphate | 16 | 10 | 10 | 15 | 10 |
| Triethyl phosphate | 20 | 15 | 15 | 15 | 15 |
| Water | 24 | 11 | 15 | 19 | 15 |
| Surfactant L-5345 | 3 | 3 | 2 | 2 | 2 |
| Dimethylaminoethoxyethanol | 3 | 2 | 3 | 3 | 2 |
| Trimethyl hydroxyethyl ethylenediamine | 1 | 1 | 1 | 1.5 | 1 |
| N,N,N'-trimethyl-N'-hydroxyethyl diamino ethyl ether | 1 | | 1 | 1 | 0 |
| Dimethylethanolamine | 0 | 1 | 0 | 0 | 0 |
| Glycerol or Triethanolamine | 0 | 1 | 0 | 0 | 1 |

TABLE 2

| Item | Example 1 | Example 2 | Example 3 | Example 4 | Example 5 | standard number |
|---|---|---|---|---|---|---|
| Construction way | Spraying | Spraying | Spraying | Spraying | Perfusion | / |
| Foam density, kg/m$^3$ | 8 | 12 | 9.5 | 9 | 9.5 | GB/T6343-2009 |
| Rate of yield of comprehensive construction, m$^3$/ton | 115 | 75 | 95 | 100 | 90 | / |
| Solidifying time, s | 10 | 10 | 10 | 10 | 30 | / |
| heat conductivity coefficient at 23° C., w/m.K | 0.03720 | 0.03571 | 0.03660 | 0.03710 | 0.03650 | GB10295 |
| aperture ratio, % | 94.5 | 92.0 | 93.6 | 94.3 | 94.3 | ASTM D-2856 |
| compressive strength KPa | 15.9 | 25.1 | 18.8 | 18.0 | 19.2 | GB8813 |
| Dimensional stability at −30° C., % | −0.1 | −0.3 | −0.2 | −0.3 | −0.1 | GB3399 |

TABLE 2-continued

Foam properties

| Item | Example 1 | Example 2 | Example 3 | Example 4 | Example 5 | standard number |
|---|---|---|---|---|---|---|
| Average adhesion | Higher than the strength of the foam | Higher than the strength of the foam | Higher than the strength of the foam | Higher than the strength of the foam | Higher than the strength of the foam | GB50404 |
| linear deformation within 48 h, −30° C., % | <0.1 | <0.1 | <0.1 | <0.1 | <0.1 | GB8811 |
| The time of horizontal flame, s | 7 | 35 | 34 | 13 | 30 | GB8332-2008 |
| The range of horizontal flame, mm | 8 | 90 | 90 | 70 | 86 | GB8332-2008 |

The above performance tests use the testing standards which are commonly used in the field, and moreover, the test method and the devices are well known and common in the field.

The invention claimed is:

1. A composition for a polyurethane foam, wherein based on 100 parts by weight of the composition, the composition comprises the following materials in parts by weight:
   10-30 parts of a polyether polyol A;
   20-40 parts of a polyether polyol B;
   10-40 parts of a flame retardant;
   10-30 parts of water;
   1-4 parts of a surfactant; and;
   1-8 parts of a catalyst;
wherein, the average functionality of polyether polyol A is 4-8, and the hydroxyl value of polyether polyol A is 300-700 mgKOH/g;
wherein, the average functionality of polyether polyol B is 2-4, and the hydroxyl value of polyether polyol B is 20-200 mgKOH/g;
wherein, the flame retardant is a phosphate or a mixture of phosphates, and the phosphorus content of the flame retardant is 8-40 wt %;
wherein, the catalyst is a mixture of hydroxyl group-containing organic tertiary amines; and;
wherein the polyether polyol B is produced by the polymerization of propylene oxide, ethylene oxide and an initiator, the initiator is a mixture of glycerol and a component selected from the group consisting of dipropylene glycol, diethylene glycol, triethanolamine and combinations thereof, wherein the polyether polyol B comprises a terminal block based on ethylene oxide.

2. The composition according to claim 1, wherein the polyether polyol A is produced by the polymerization of propylene oxide, ethylene oxide and an initiator, the initiator for polyether polyol A is a mixture of tris(hydroxymethyl) propane and a component selected from the group consisting of sorbitol, sucrose, pentaerythritol, 2,4-diamino-phenol, ethylenediamine and combinations thereof; wherein the propylene oxide and the ethylene oxide for polyether polyol A are provided at a molar ratio of 7:3-9:1.

3. The composition according to claim 1, wherein the polyether polyol A is produced by the polymerization of propylene oxide, ethylene oxide and an initiator, the initiator for polyether polyol A is a mixture of sucrose, tris(hydroxymethyl)propane, and sorbitol; the average functionality of polyether polyol A is 4-5; the hydroxyl value of polyether polyol A is 400-500 mgKOH/g; the propylene oxide and the ethylene oxide for polyether polyol A are provided at a molar ratio of 7:3-8:2.

4. The composition according to claim 1, wherein the polyether polyol A is produced by the polymerization of propylene oxide, ethylene oxide and an initiator, the initiator for polyether polyol A is selected from the group consisting of 2,4-diamino-phenol, ethylenediamine, and combinations thereof; the average functionality of polyether polyol A is 4-5; the hydroxyl value of polyether polyol A is 500-700 mgKOH/g; the propylene oxide and the ethylene oxide for polyether polyol A are provided at a molar ratio of 7:3-9:1.

5. The composition according to claim 1, wherein the initiator for polyether polyol B is a mixture of triethanolamine and glycerol, and wherein the hydroxyl value of polyether polyol B is 20-90 mgKOH/g.

6. The composition according to claim 1, wherein the surfactant is formed by block copolymerization of polymethyl siloxane, propylene oxide and ethylene oxide.

7. The composition according to claim 1, wherein the catalyst comprises a mixture of dimethylamino ethoxyethanol and trimethylethoxyethylenediamine, and further comprises one or more of N, N, N'-trimethyl-N'-hydroxyethyl diamino ethyl ether, trimethyl hydroxyethyl propanediamine, and dimethylethanolamine.

8. The composition according to claim 1, wherein the flame retardant is a mixture of triethyl phosphate and a component selected from the group consisting tris(2-chloropropyl) phosphate, tris(2-chloroethyl) phosphate and combinations thereof, wherein triethyl phosphate represents at least 40% of the total parts by weight of the flame retardant.

9. The composition according to claim 1, wherein the composition further comprises 0-3 wt % of other additives, and the other additives are selected from triethanolamine, glycerol, and combinations thereof.

10. A polyurethane foam, which is obtained from the composition according to claim 1.

11. The polyurethane foam according to claim 10, which is obtained by the reaction of the composition with polyphenylpolymethylene polyisocyanate (PAPI).

12. A thermal insulation filling material, thermal insulation material, sound insulation material, damp proofing material for buildings, or packaging material for precise instrument comprising the polyurethane foam of claim 10.

13. The composition according to claim 1 comprising the following materials in parts by weight:
   15-25 parts of polyether polyol A;
   25-35 parts of polyether polyol B;
   20-30 parts of flame retardant;
   13-18 parts of water;
   2-3 parts of surfactant; and
   3-6 parts of catalyst.

14. The composition according to claim 1, wherein the catalyst is a composition of dimethylamino ethoxyethanol, trimethylethoxylethylenediamine and optionally N,N,N'-trimethyl-N'-hydroxyethyl diamino ethyl ether in a mass ratio of 1-3:1-3:0-3.

15. The composition according to claim 1, wherein the flame retardant is the mixture of triethyl phosphate and tris(2-chloropropyl) phosphate in a mass ratio of 1-3:1-3.

* * * * *